United States Patent

Kazmark, Jr.

[11] Patent Number: 5,590,891
[45] Date of Patent: Jan. 7, 1997

[54] CART AND LUGGAGE HANDLE ASSEMBLY WITH ROTATABLE RELEASE MEMBER

[75] Inventor: Eugene A. Kazmark, Jr., Joliet, Ill.

[73] Assignee: Remin Laboratories, Inc., Joliet, Ill.

[21] Appl. No.: 67,223

[22] Filed: May 26, 1993

[51] Int. Cl.⁶ .................................................. B62B 3/02
[52] U.S. Cl. ..................... 280/37; 280/655; 280/47.26; 403/109; 403/321
[58] Field of Search ............. 280/37, 651, 652, 280/654, 655, 655.1, 47.26, 47.315, 658, DIG. 6, 823; 403/109, 321, 324, 326

[56] References Cited

U.S. PATENT DOCUMENTS

| | | | |
|---|---|---|---|
| 2,289,818 | 7/1942 | Winner et al. | 403/109 |
| 3,572,870 | 3/1971 | Marks et al. | 312/244 |
| 3,702,016 | 11/1972 | Keesee | 16/111 |
| 3,998,476 | 12/1976 | Kazmark, Sr. | 280/655 |
| 4,183,691 | 1/1980 | Van Melle | 403/109 |
| 4,354,689 | 10/1982 | Perego | 280/47.37 |
| 4,577,877 | 3/1986 | Kassai | 280/47.37 |
| 4,754,985 | 7/1988 | Im et al. | 280/40 |
| 4,846,485 | 7/1989 | Payne | 280/47.315 |
| 4,974,871 | 12/1990 | Mao | 280/651 |
| 5,127,664 | 7/1992 | Cheng | 280/655 |
| 5,178,404 | 1/1993 | Chen | 280/655 |

*Primary Examiner*—Richard M. Camby
*Attorney, Agent, or Firm*—Tilton, Fallon, Lungmus & Chestnut

[57] ABSTRACT

A handle assembly for carts and wheeled luggage includes a pair of tube assemblies disposed in substantially parallel relation and connected by a handle member. The tube assemblies carry lock buttons which cooperate with a pair of rotatable release members to releasably lock the tube assemblies in an extended or retracted position.

7 Claims, 2 Drawing Sheets

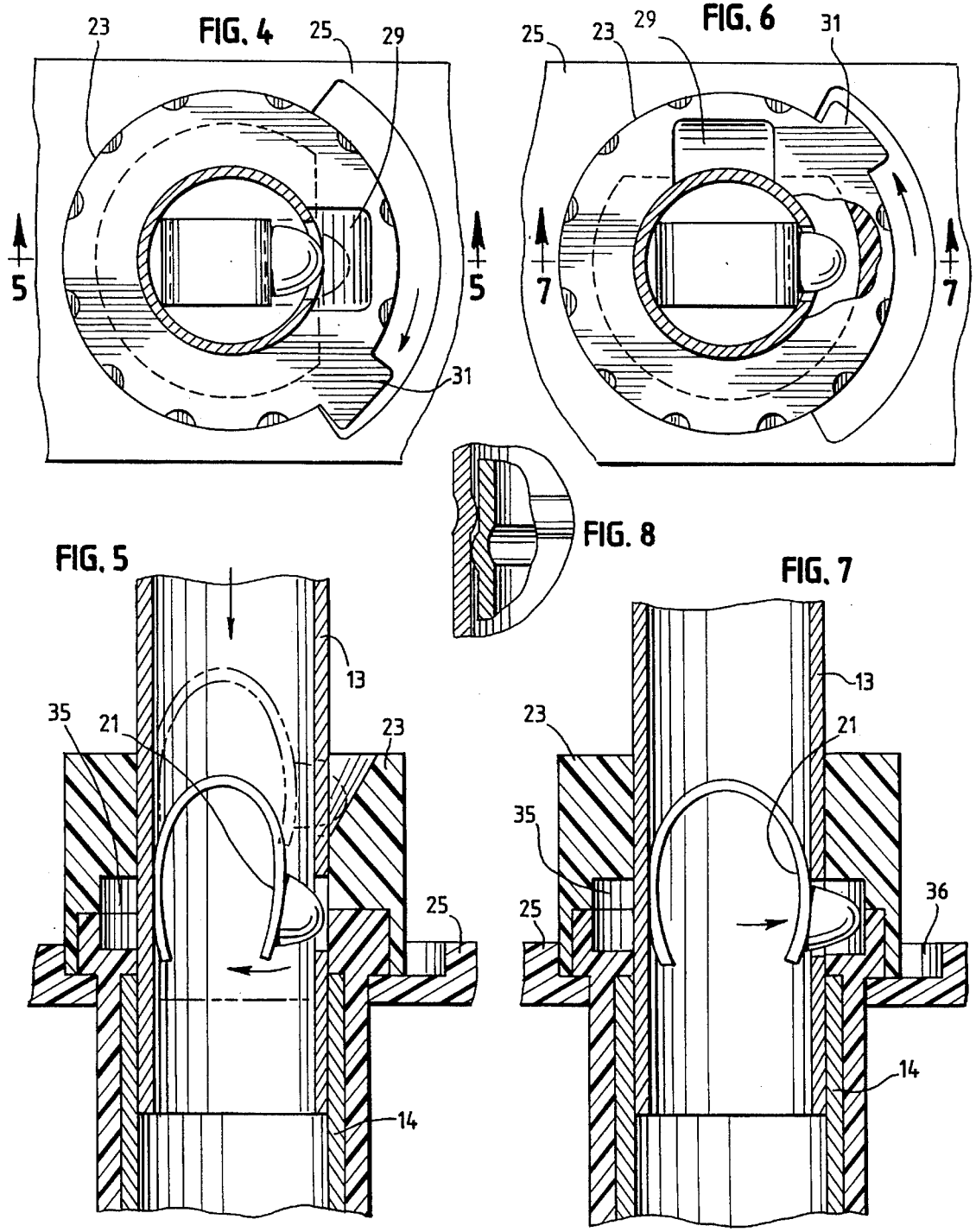

CART AND LUGGAGE HANDLE ASSEMBLY WITH ROTATABLE RELEASE MEMBER

BACKGROUND OF THE INVENTION

1. Field of the Invention

The present invention relates to a handle assembly for a portable luggage cart or wheeled luggage and more particularly to a handle assembly which includes a pair of telescoping tube assemblies that carry lock buttons which cooperate with a pair of rotatable release members to releasably lock the tubes of the assemblies in an extended or a retracted position.

2. Description of the Prior Art

The prior art includes a wide variety of luggage carriers or carts and wheeled luggage with telescoping and collapsible handle assemblies. The portable luggage carrier described in Kazmark, Sr. U.S. Pat. No. 3,998,476 includes a handle assembly comprising a pair of collapsible and telescoping tube assemblies. The lower ends of the intermediate and upper tubes carry lock buttons which extend through openings in the upper ends of the lower and intermediate tubes to releasably lock the tubes in an extended position. A pair of upper and lower release bars which extend between the tube assemblies adjacent the upper ends of the lower tubes release the lock buttons.

The release bars of the luggage carrier described above provide easy release of the lock buttons. However, this arrangement does not lend itself to installation in wheeled luggage.

The handle assembly of the present invention includes a rotatable release which cooperates with lock buttons carried by the assembly tubing to allow a user to place and lock the assembly in an extended or a retracted position. The assembly is a simple construction which minimizes the expense of manufacture and assembly and provides effective operation.

SUMMARY OF THE INVENTION

In accordance with one embodiment of the present invention, a handle assembly for wheeled carts or luggage includes at least one tube assembly with first and second tubes. The first tube extends into the second tube in telescoping relation with the second tube. Latching means including a spring-loaded lock button disposed in the first tube extends through an opening in the first tube to lock the first tube in a predetermined position and prevent relative sliding movement between the first tube and the second tube. A rotatable release means disposed circumjacent the telescoping tube assembly releases the spring-loaded lock button to allow relative sliding displacement between the first and second tubes.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 4 is a plan view of the release in place around a tube assembly, showing the release in an unlocking mode;

FIG. 5 is a sectional view taken along line 5—5 in FIG. 4;

FIG. 6 is the plan view shown in FIG. 4 with the release placed in a locking mode;

FIG. 7 is a sectional view taken along line 7—7 in FIG. 6; and

FIG. 8 is an enlarged sectional view of stops formed in the tube assemblies of the handle assembly.

While the following disclosure describes the invention in connection with one embodiment one should understand that the invention is not limited to this embodiment. Furthermore, one should understand that the drawings are not to scale and that graphic symbols, diagrammatic representations, and fragmentary views, in part, illustrate the embodiment. In certain instances, the disclosure may not include details which are not necessary for an understanding of the present invention such as conventional details of fabrication and assembly.

DETAILED DESCRIPTION OF THE DRAWINGS AND AN EMBODIMENT

Figure 1:
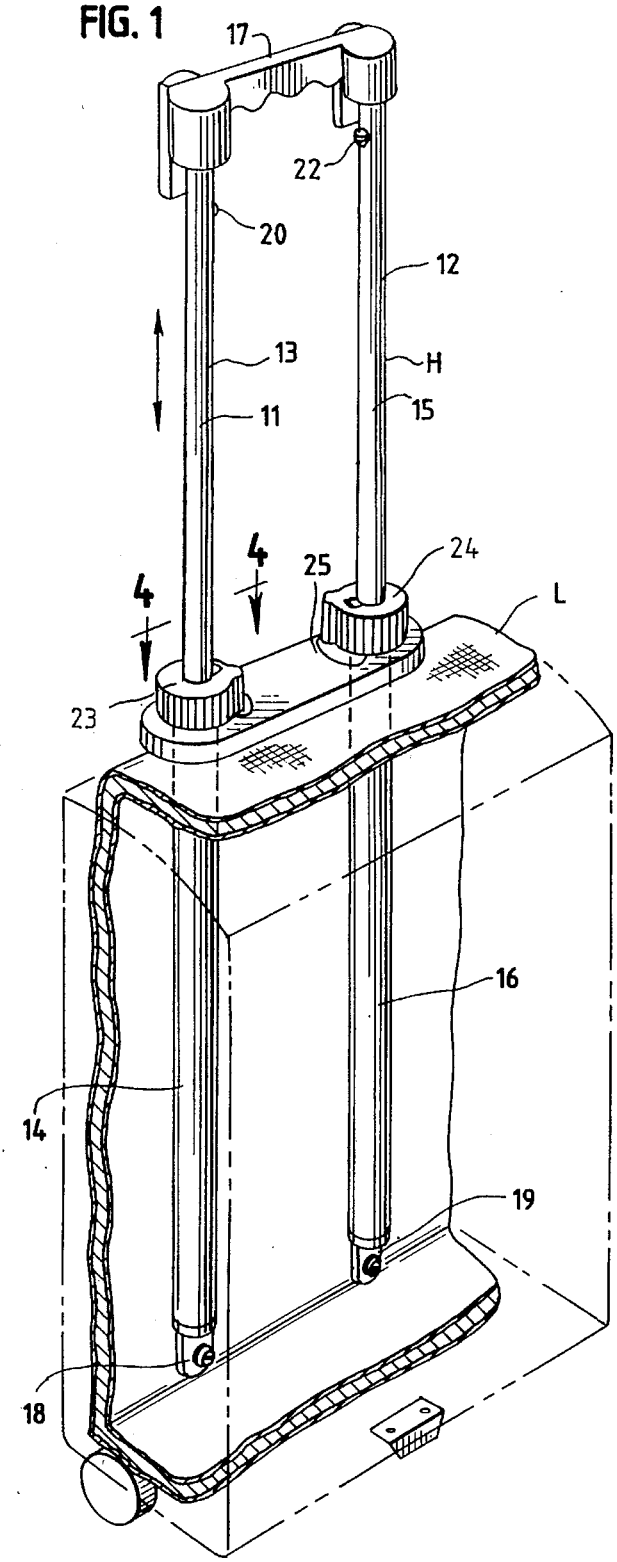
FIG. 1 is a perspective view of the handle assembly of the present invention secured to a piece of wheeled luggage with a portion of the luggage cut away to show the portion of the assembly disposed within the luggage.

Turning now to the drawings, FIG. 1 shows the handle assembly H of the present invention secured to a piece of wheeled luggage L. The luggage L may be any one of a wide variety of commercially available products. In addition, although the handle assembly of the present invention finds particular utility in wheeled luggage, it may also serve as a handle assembly in two-wheeled carts or other similar devices.

The handle assembly H includes a pair of telescoping tube assemblies 11 and 12 disposed in parallel relation and secured to the bottom of the luggage as shown in FIG. 1 and at the top of the luggage L as shown in FIGS. 5 and 7. The assembly 11 includes a first tube 13 and a second tube 14. The assembly 12 includes a third tube 15 and a fourth tube 16. The lower tubes 14 and 16 are round tubes; and the tube 14 has the same length and inside and outside diameter as tube 16. The tubes 14 and 16 receive the upper tubes 13 and 15 which are also round and which have an outside diameter smaller than the inside diameter of the tubes 14 and 16. The tube 13 has the same length, inside diameter, and outside diameter as the tube 15. (The tubes are made of aluminum, stainless steel or any other suitable material. In addition, although the embodiment shown includes round tubes, the tubes may have a square configuration, a generally rectangular configuration, or any other suitable cross-sectional configuration.)

A handle member 17 made out of hard plastic or any other material of high strength and rigidity lies fixedly secured to the top ends of the tubes 13 and 15. (Alternatively, the tubes 13 and 15 and the handle 17 may be a one-piece, integrally formed unit.) Tabs 18 and 19 lie fixedly secured to end portions of the tubes 14 and 16, respectively, and to the luggage L. These tabs 18 and 19 and handle member 17 prevent rotation of the upper tubes 13 and 15 and the lower tubes 14 and 16 to facilitate locking and unlocking the tube assemblies in predetermined positions as described below.

The tube 13 carries a spring-loaded lock button 20 (including a spring portion and a button portion) at its top end (See FIG. 1) and a spring-loaded lock button 21 at its bottom end (See FIGS. 5 and 7). Similarly, the tube 15 carries a spring-loaded lock button 22 at its top end and another such lock button (not shown) at its bottom end. The lock buttons extend through corresponding openings in the tubes 13 and 15. The top lock buttons 20 and 22 cooperate with a pair of rotatable lock and release members 23 and 24 to releasably secure the top portion of the handle assembly including tubes 13 and 15 and handle member 17 in a retracted position (not shown) in which the handle member 17 lies proximate the lock and release members. The bottom lock buttons also cooperate with the two lock and release members 23 and 24 to releasably secure the top portion of the handle assembly in the extended position shown in FIG. 1.

The members 23 and 24 lie on a bracket 25 which acts as a spacer for the two tube assemblies 11 and 12, a support for the members 23 and 24 and an indicator as described below. The members lie rotatably mounted to the shell of the luggage L, the bracket 25 and their corresponding tube assemblies. A spacer and lock ring (not shown) disposed around the bottom of each member secures the member against sliding movement upwardly from the position shown in FIG. 1.

Figure 2:
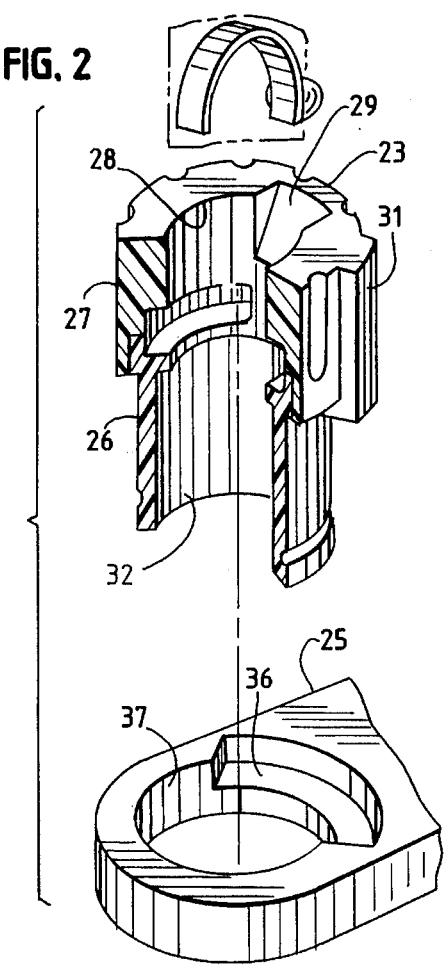
FIG. 2 is a partial perspective view of the rotatable release with a portion of the release cut away.
Figure 3:
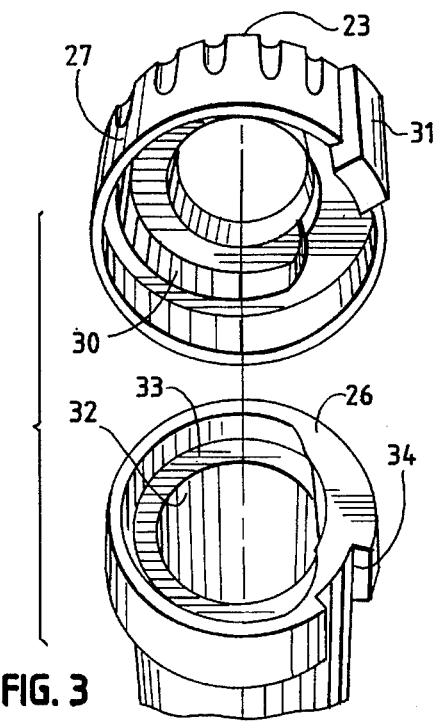
FIG. 3 is a partial perspective and exploded view of the release shown in FIG. 2.

The member 23 includes a base segment 26 and a cap segment 27 which fits over the base segment as shown in FIG. 2. (Adhesive or any other suitable means secures the two segments together.) The cap segment defines a central opening 28 through which the tube 13 extends, a ramp 29 which provides camming action for pushing the lock button 20 inwardly of the tube 13, a groove 30 and a tab or key 31 (See FIG. 3). The base segment 26 defines a central opening 32 for receiving the tubes 13 and 14, a groove 33 and a keyway 34. (Although the disclosed embodiment shows the bottom tubes 14 and 16 extending to the level of bracket 25, the bottom tubes 14 and 16 may extend to a higher level and include openings which register with the lock button openings in the upper tubes and allow the lock buttons to extend through them.)

When the cap segment 27 lies in place on the base segment 26, the key 31 extends into keyway 34 to properly align the two segments; and the grooves 30 and 33 combine to form a circular groove 35 adjacent the openings 28 and 32. This groove 35 extends around those openings except for a predetermined length disposed below the ramp 29. The groove 35 receives a lock button as shown in FIGS. 6 and 7 to lock the assembly in either an open or retracted position.

As stated above, the lock and release member 23 lies rotatably mounted to the shell of the luggage L, the bracket 25 and the tube assembly 11. A bottom portion of the key 31 extends into a groove 36 which lies adjacent an opening 37 in the bracket 25 through which the tube assembly 11 extends. The ends of the groove 36 act as a stop for the key 31 and limit the rotation of the member 23. These stops (with appropriate markings) also indicate whether the member 23 lies in a locked or unlocked mode.

In the position shown in FIGS. 4 and 5, the member 23 lies in an unlocked mode and the button 21 lies in alignment with the ramp 29. Thus, the button 21 cannot extend outwardly of the tube 13 and the tube 13 may move downwardly into tube 14 until the button 20 moves through the ramp 29 and into the position of the button 21 in FIGS. 5 and 7. (The tube 13 cannot move upwardly because of corresponding stops shown in FIG. 8 which limit the sliding movement of the tube 13 between the extended position shown in FIGS. 1 and 4–7 and the retracted position in which the button 20 lies in alignment with the groove 35.) In the position shown in FIGS. 6 and 7, the member 23 lies in a locked mode and the button 21 extends into the groove 35 and prevents sliding movement between tube 13 and 14.

Although the above description relates to the release member 23, it applies to the release member 24 which has the same elements and operates in the same manner (around tube assembly 12) as the member 23. In operation, a user places the members 23 and 24 in the unlocked mode (See FIG. 4). He or she may then move the tubes 13 and 15 in a fully retracted position or a fully extended position (See FIG. 1) as defined by stops such as the ones shown in FIG. 8. Then, the user may rotate the members 23 and 24 to the locked position (See FIG. 6) to lock the tubes 13 and 15 in the selected position.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A handle assembly for wheeled carts or luggage, said assembly comprising:

(a) first and second tubes, the first tube extending into the second tube in telescoping relation with the second tube;

(b) latching means disposed in one of the tubes for locking the first tube in a predetermined position relative to the second tube;

(c) release means disposed circumjacent the tubes for rotation about an axis which lies generally parallel to the longitudinal axes of the tubes, said release means including means for unlatching the latching means and allowing sliding movement of the first relative to the second tube.

2. The handle assembly of claim 1, wherein the latching means includes a spring-loaded button which extends through an opening in the first tube to lock the first tube relative to the second tube.

3. The handle assembly of claim 2, wherein the release means defines a central opening through which the first tube extends and a groove for receiving the button of the latching means, said groove extending around a portion of the release means.

4. A handle assembly for wheeled carts or luggage, said assembly comprising:

(a) a first tube assembly including first and second tubes, the first tube extending into the second tube in telescoping relation with the second tube;

(b) a second tube assembly including third and fourth tubes, the third tube extending into the fourth tube in telescoping relation with the fourth tube;

(c) said first and second tube assemblies disposed in substantially parallel relation;

(d) latching means disposed in the first and second tube assemblies for locking one tube of each assembly relative to the other tube;

(e) release means for each tube assembly, each of said release means cooperating with the corresponding tube assembly and disposed circumjacent the tubes of the assembly for rotation about an axis which lies generally parallel to the longitudinal axes of the tubes, said release means including means for unlatching the latching means and allowing sliding movement of the first relative to the second tube.

5. The handle assembly of claim 4, wherein the latching means includes spring-loaded buttons which extend through openings in the first and third tubes to lock the first tube relative to the second tube and the third tube relative to the fourth tube.

6. The handle assembly of claim 4, wherein the release means defines a central opening through which the first tube extends and a groove for receiving a button of the latching means, said groove extending around a portion of the release means.

7. The handle assembly of claim 6, further comprising a handle member disposed between the distal ends of the first and third tubes.

* * * * *